US012668169B2

(12) United States Patent　　　(10) Patent No.: US 12,668,169 B2

Goldwitz　　　　　　　　　　　　　(45) Date of Patent:　Jun. 30, 2026

(54) BED ANCHOR

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 0 days.

(21) Appl. No.: 19/263,391

(22) Filed: Jul. 8, 2025

(65) Prior Publication Data

US 2026/0124983 A1　May 7, 2026

Related U.S. Application Data

(60) Provisional application No. 63/717,775, filed on Nov. 7, 2024.

(51) Int. Cl.
　　*B60P 7/08*　　　(2006.01)
　　*B60P 7/13*　　　(2006.01)
(52) U.S. Cl.
　　CPC ...................................... *B60P 7/13* (2013.01)
(58) Field of Classification Search
　　CPC　B60P 7/0892; B60P 7/13; B60P 7/135; B60P 7/0807; B60P 7/0823
　　USPC .......... 410/94–102, 106, 116–119, 121, 155; 280/759
　　See application file for complete search history.

(56) References Cited

U.S. PATENT DOCUMENTS

| | | | | |
|---|---|---|---|---|
| 4,339,142 A * | 7/1982 | Tanner | ................. | B62D 49/085 |
| | | | | 280/759 |
| 5,897,138 A * | 4/1999 | Hall | ........................ | B60P 3/426 |
| | | | | 280/759 |
| 6,527,488 B2 * | 3/2003 | Elze | ..................... | B65D 81/052 |
| | | | | 410/119 |
| 7,311,483 B1 * | 12/2007 | Nudo | .................... | B60P 7/0869 |
| | | | | 410/99 |
| 7,837,421 B1 * | 11/2010 | Rowe | ........................ | B60P 3/40 |
| | | | | 410/97 |
| 2006/0263165 A1 * | 11/2006 | Roloff | ..................... | B60P 3/073 |
| | | | | 410/119 |
| 2008/0206010 A1 * | 8/2008 | Fa-Kouri | ................ | B60P 3/122 |
| | | | | 410/100 |

* cited by examiner

*Primary Examiner* — Stephen T Gordon

(74) *Attorney, Agent, or Firm* — Furr Law Firm; Jeffrey M. Furr

(57)　　　　　　　　ABSTRACT

The current invention is a bed anchor that is used to secure items in a vehicle's bed. It is comprised of a flexible anchor that can be positioned between the bed and a tailgate. It is made of a flexible soft material. It can be a solid anchor or a bag or net filled with a soft fluid material like plastic or rubber balls or sand or packing material. A bed anchor needs to not be hard so not the scratch or dent the vehicle when being used to store items.

19 Claims, 24 Drawing Sheets

-Prior Art-

-Prior Art-

-Prior Art-

-Prior Art-

Fig. 20 side view 820    1 side section view 840    820    1

Front view 840    820

Back view

840

BED ANCHOR

PRIORITY

This application claims the priority date of Provisional Application 63/717,775 filed on Nov. 7, 2024.

TECHNICAL FIELD

The technology discussed below relates generally to automotive accessories, and more specifically a bed anchor and securing device.

BACKGROUND

Pick-up trucks are one of the most popular and versatile vehicles in use today. Pick-up trucks typically have an enclosed cab and an open cargo bed behind the cab. The open cargo bed allows all types of things to be quickly and easily loaded, carried and unloaded. Since the first truck was made for use by non-commercial applications, there has been a need to secure things in the back of the bed that is simple to use and will not damage the vehicle.

A bed anchor needs not be hard so not the scratch or dent the vehicle when being used to store items.

There is still room for improvement in the arts.

SUMMARY

The current invention is a bed anchor that is used to secure items in a vehicle's bed. It is comprised of a flexible anchor that can be positioned between the bed and a tailgate. It is made of a flexible soft material. It can be a solid anchor or a bag or net filled with a fill material like soft fluid material and particulates like plastic or rubber balls or metal balls or sand or packing material. A bed anchor needs to not be hard so not the scratch or dent the vehicle when being used to store items. It is designed to lay flat when being install with the fill material expending the bed anchor due to gravity when it is placed on the outside of the tailbox.

DETAIL DESCRIPTION OF THE FIGURES

Figure 15:
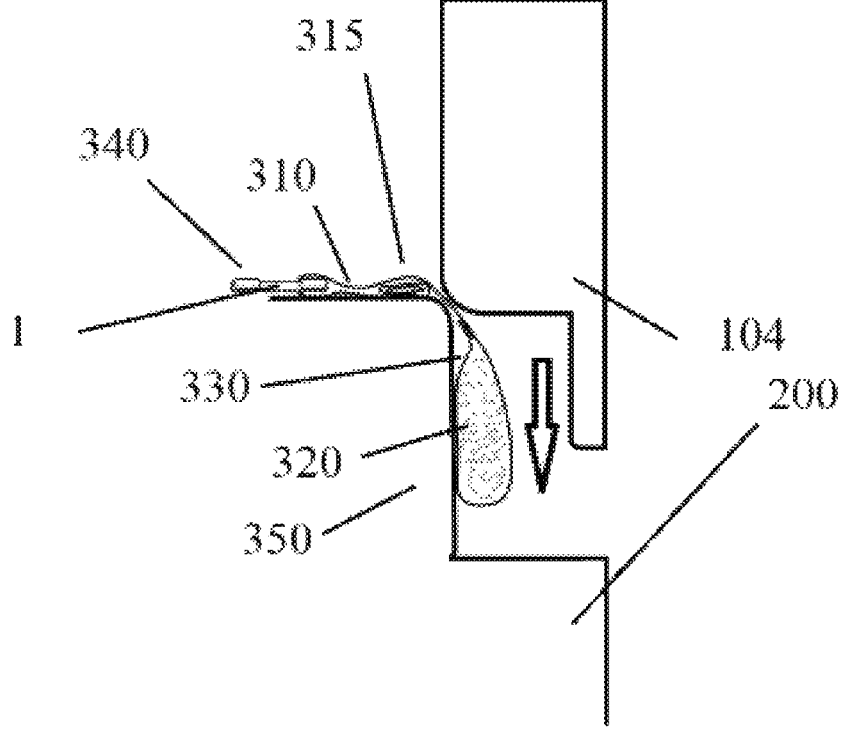

FIG. 15 another view of the bed anchor being used with the bag placed between the bed and the tailgate.

Figure 16:
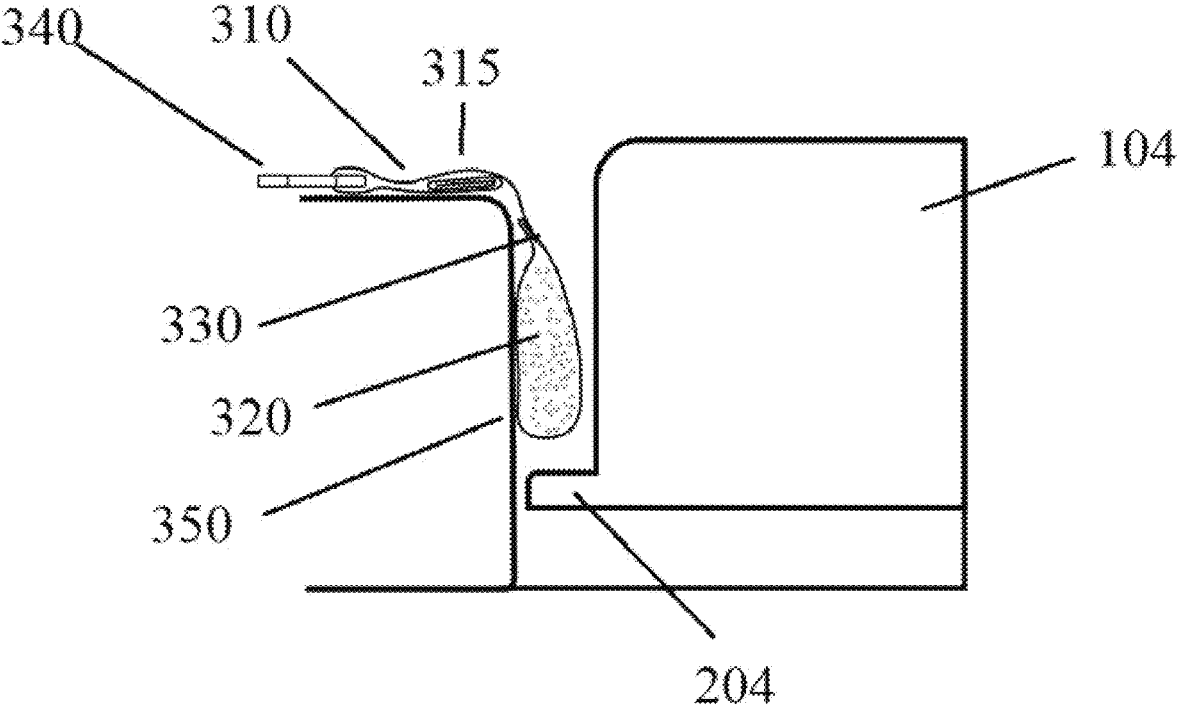

FIG. 16 shows the bed anchor being used with the bag placed with the tailgate opened.

Figure 17:
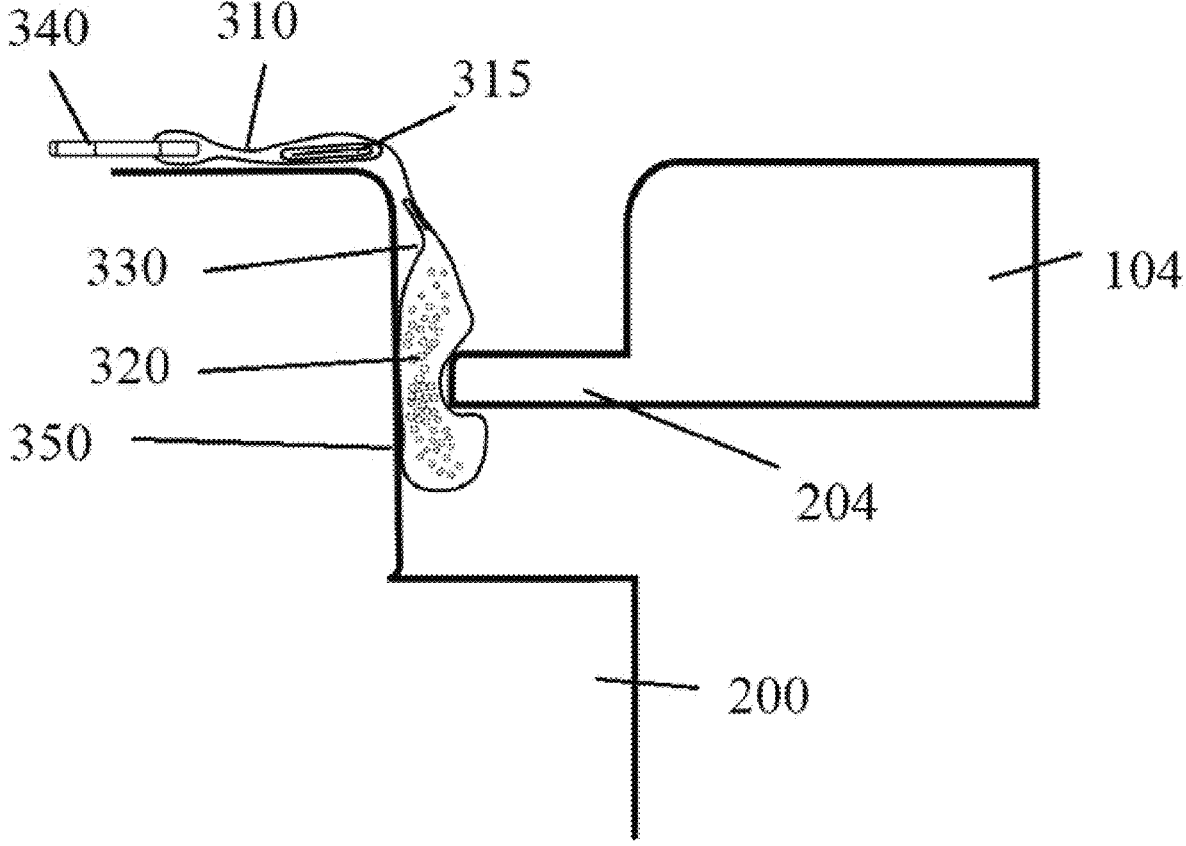

FIG. 17 shows the bed anchor with the tailgate opened with the tailgate edge intersecting the bag.

Figure 18:
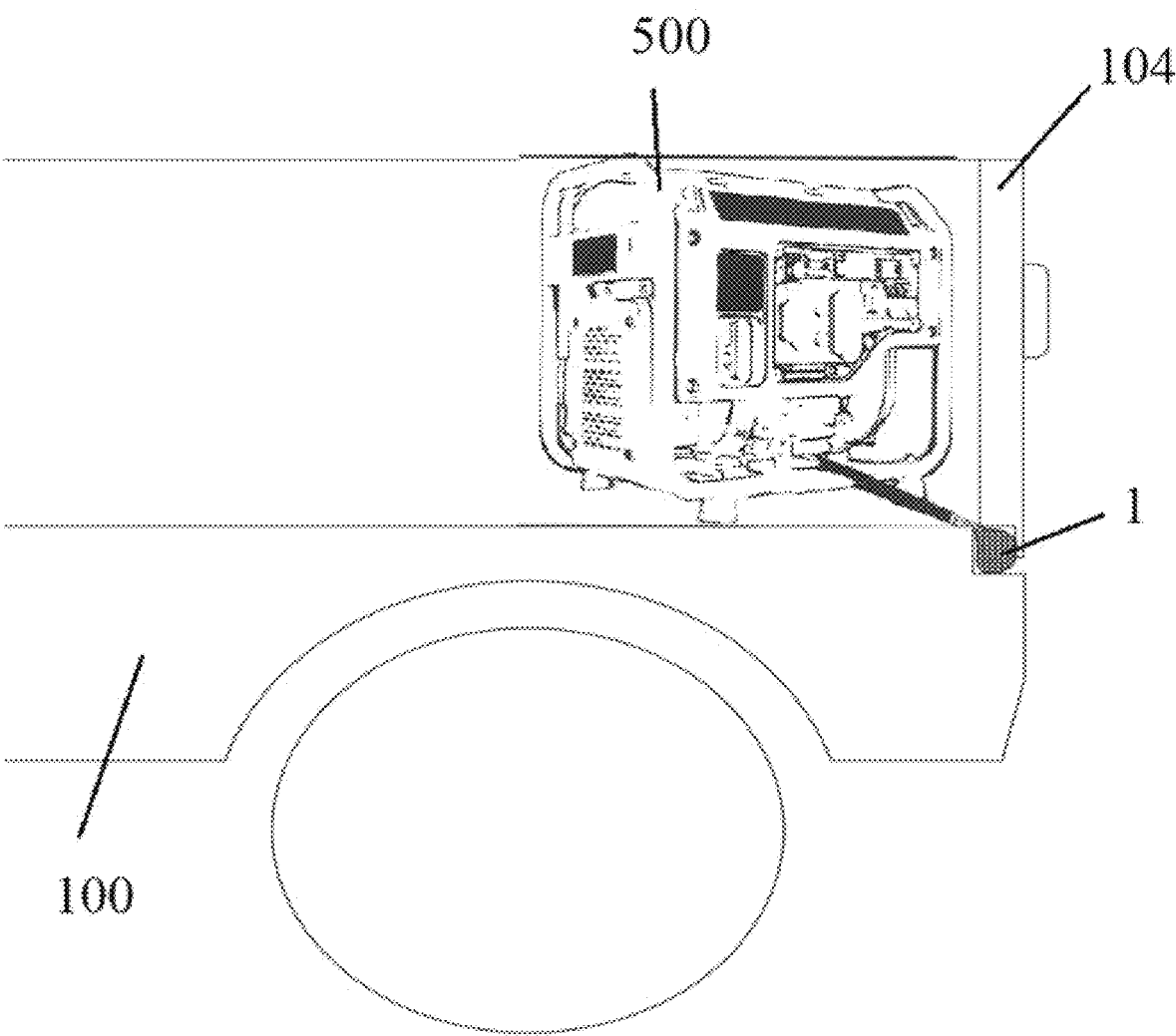

FIG. 18 shows bed anchors being used with a generator.

Figures 19, 20:
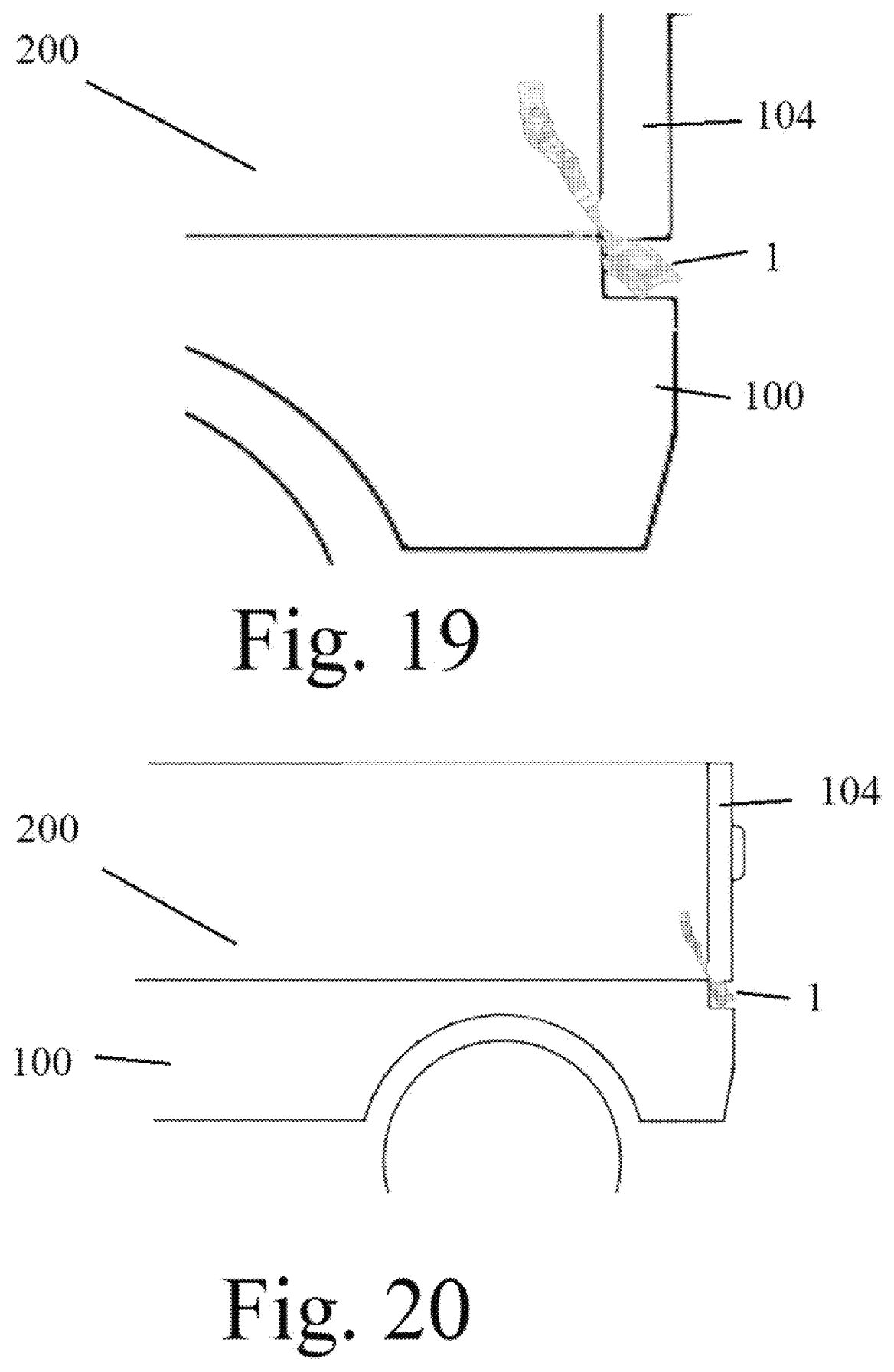

FIG. 19 is a view of a vehicle with a bed anchor positioned between the bed and the tailgate.

FIG. 20 shows a close-up view of the bed anchor.

Figures 21, 22:
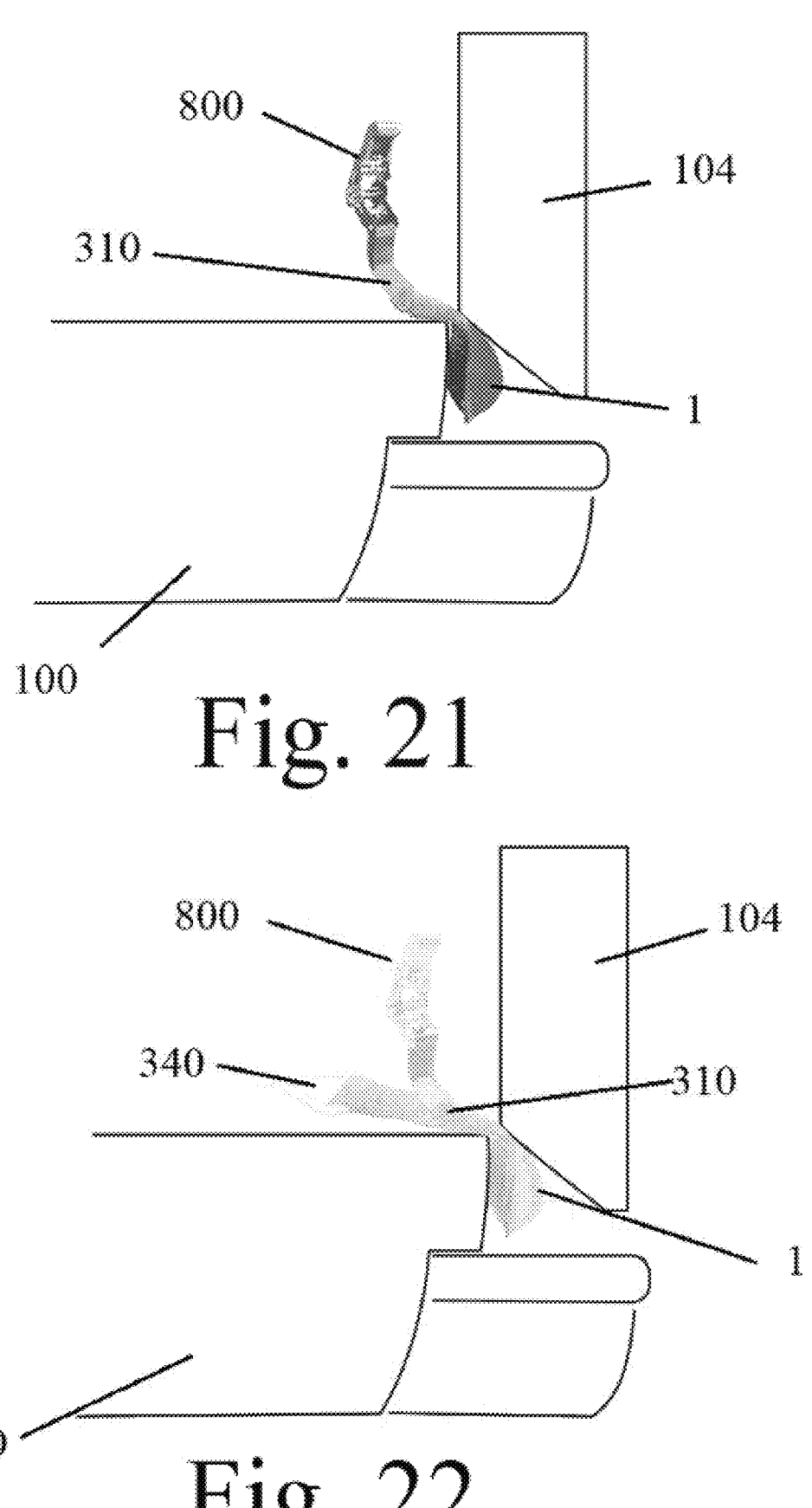

FIG. 21 shows a bed anchor with a hook as the securing means.

FIG. 22 shows a bed anchor with a hook and a bucket as dual securing means.

Figure 23:
Figure 23:
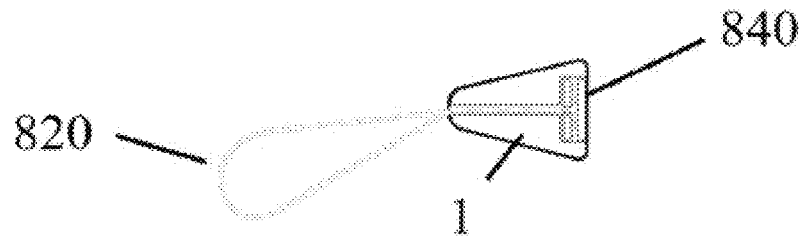
Figure 23:
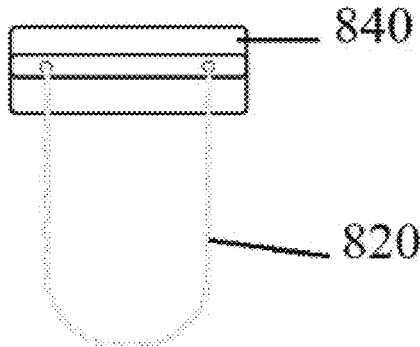
Figure 23:
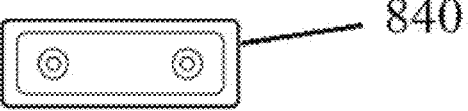

FIG. 23 shows the bed anchor with a securing cord.

Figure 24:
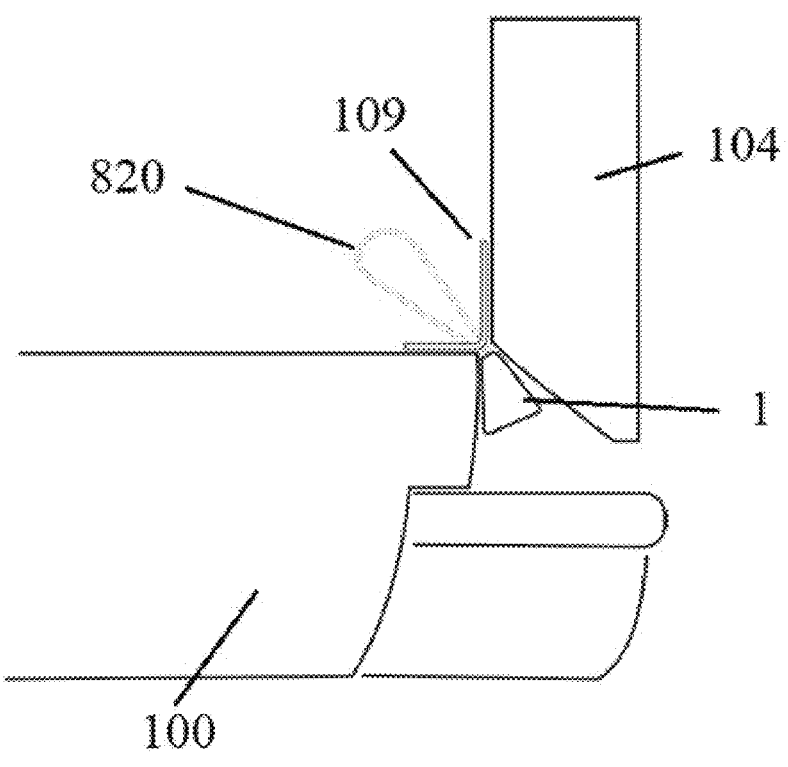

FIG. 24 shows the bed anchor using a securing cord position in a closed tailgate.

Figure 25:
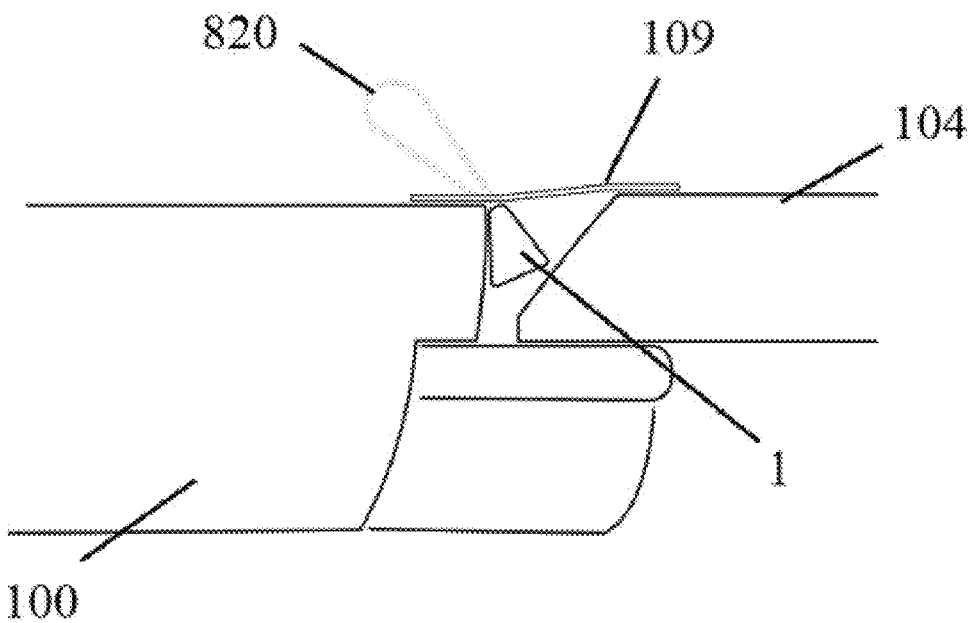

FIG. 25 shows the bed anchor with a cord configuration with an opened tailgate.

Figure 26:
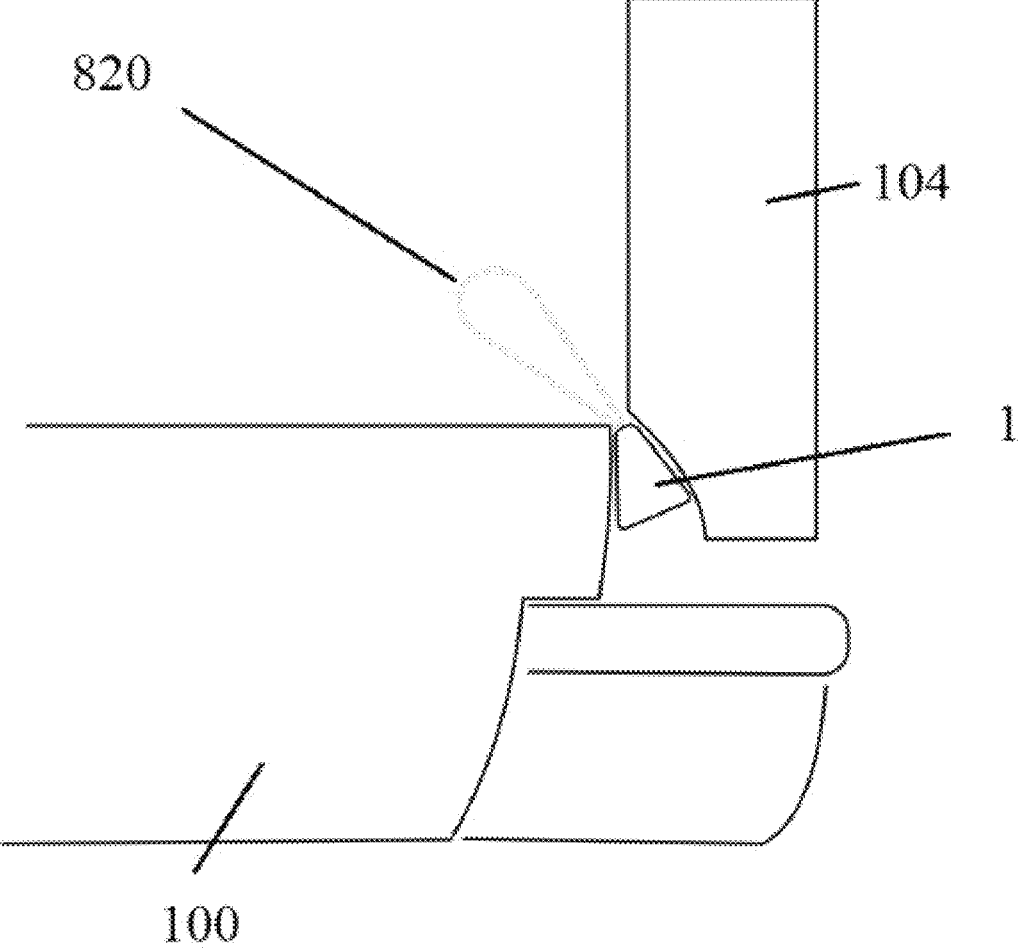

FIG. 26 shows another view of the bed anchor using a securing cord position in a closed tailgate.

Figure 27:
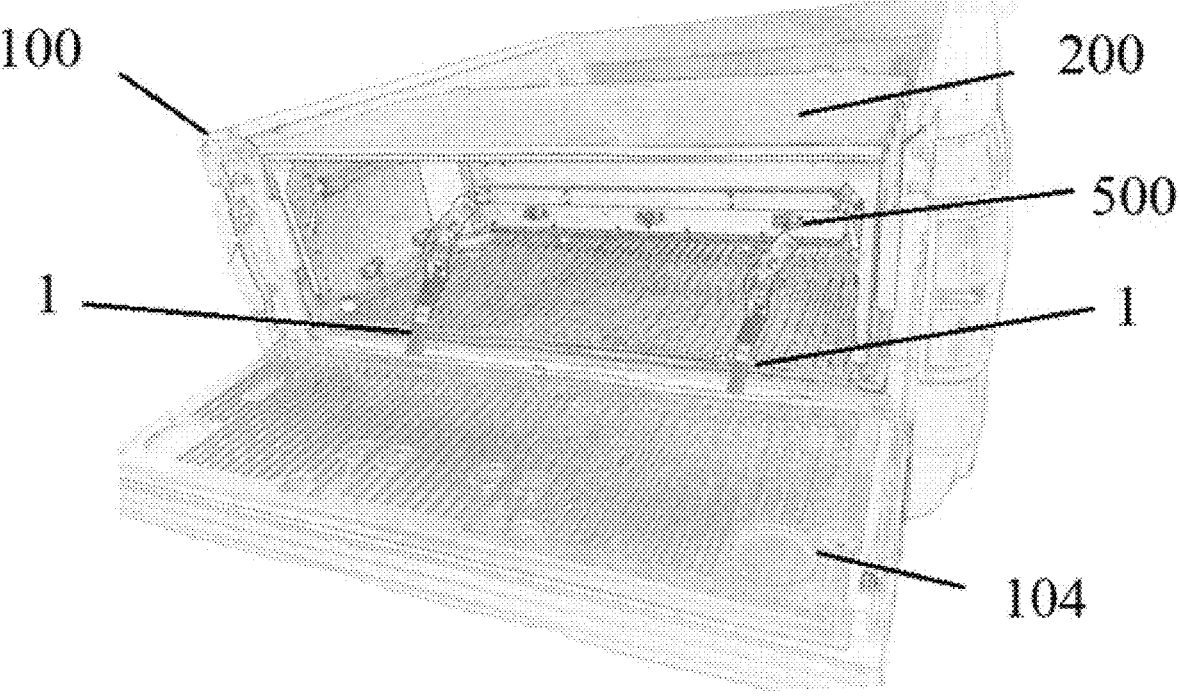

FIG. 27 shows multiple bed anchors being positioned between the tailgate and the bed.

Figure 28:
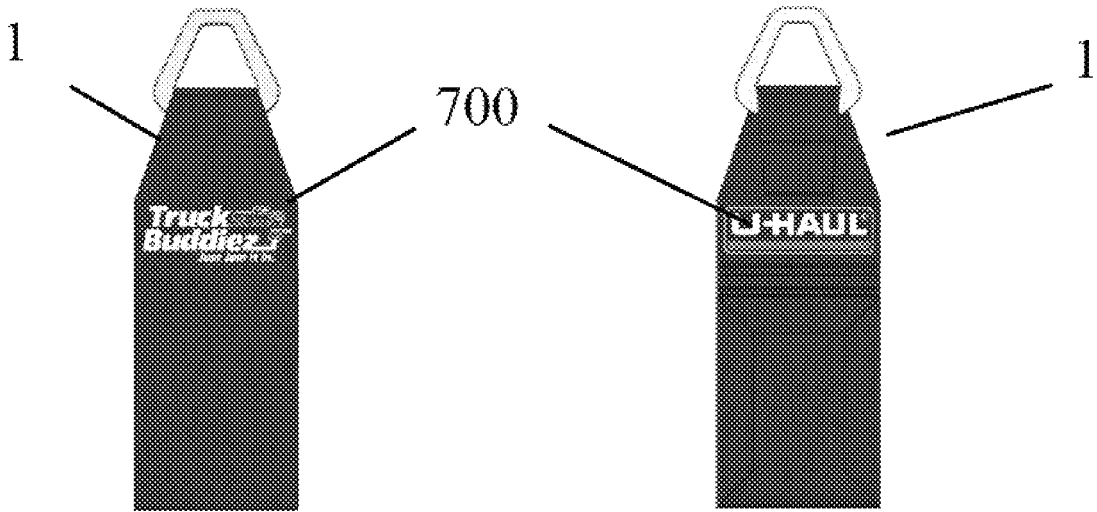

FIG. 28 shows the bed anchors with promotional images.

Figure 29:
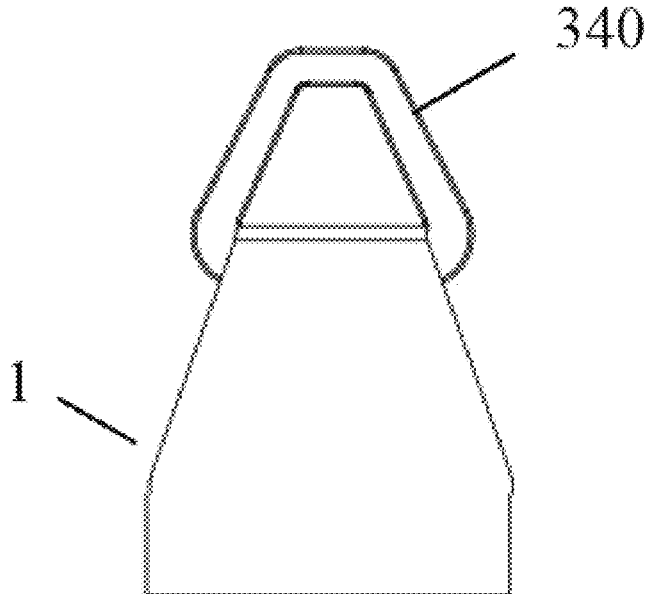

FIG. 29 shows a triangular bed anchor.

DETAILED DESCRIPTION

The illustrations presented herein are, in some instances, not actual views of any particular bed anchor, but are merely representations employed to describe the present disclosure.

Additionally, elements common between figures may retain the same numerical designation.

The current bed anchors (such as rods 2, rods with mesh 3, weighted objects 4 as shown in FIGS. 1-4 are made of hard materials. These are hard materials that can damage and even dent the vehicle while being difficult to set up and use. The prior art can even sometimes pop the springs or hinges of the tailgate 104, They can dent or scratch the surface of the vehicle 100.

Figure 5:
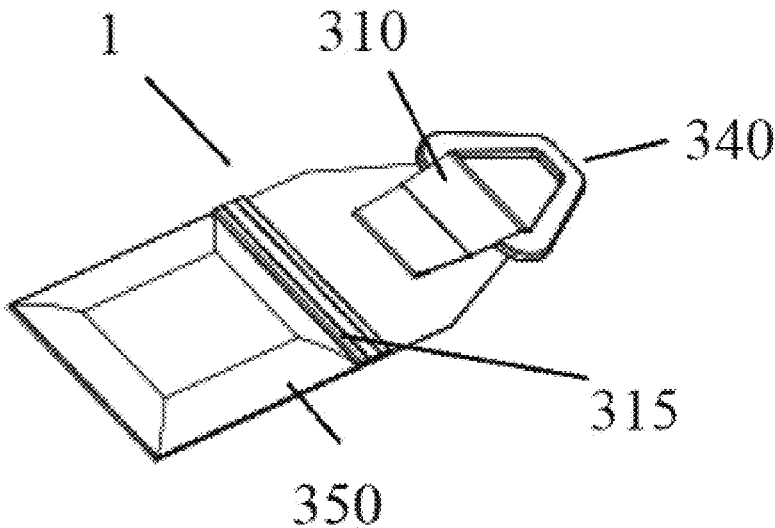
FIG. 5 shows a front perspective view of the bed anchor.
Figure 6:
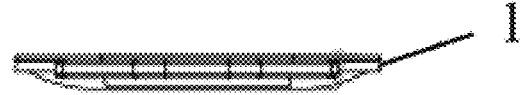
FIG. 6 shows a top view of the bed anchor.
Figures 7, 8:
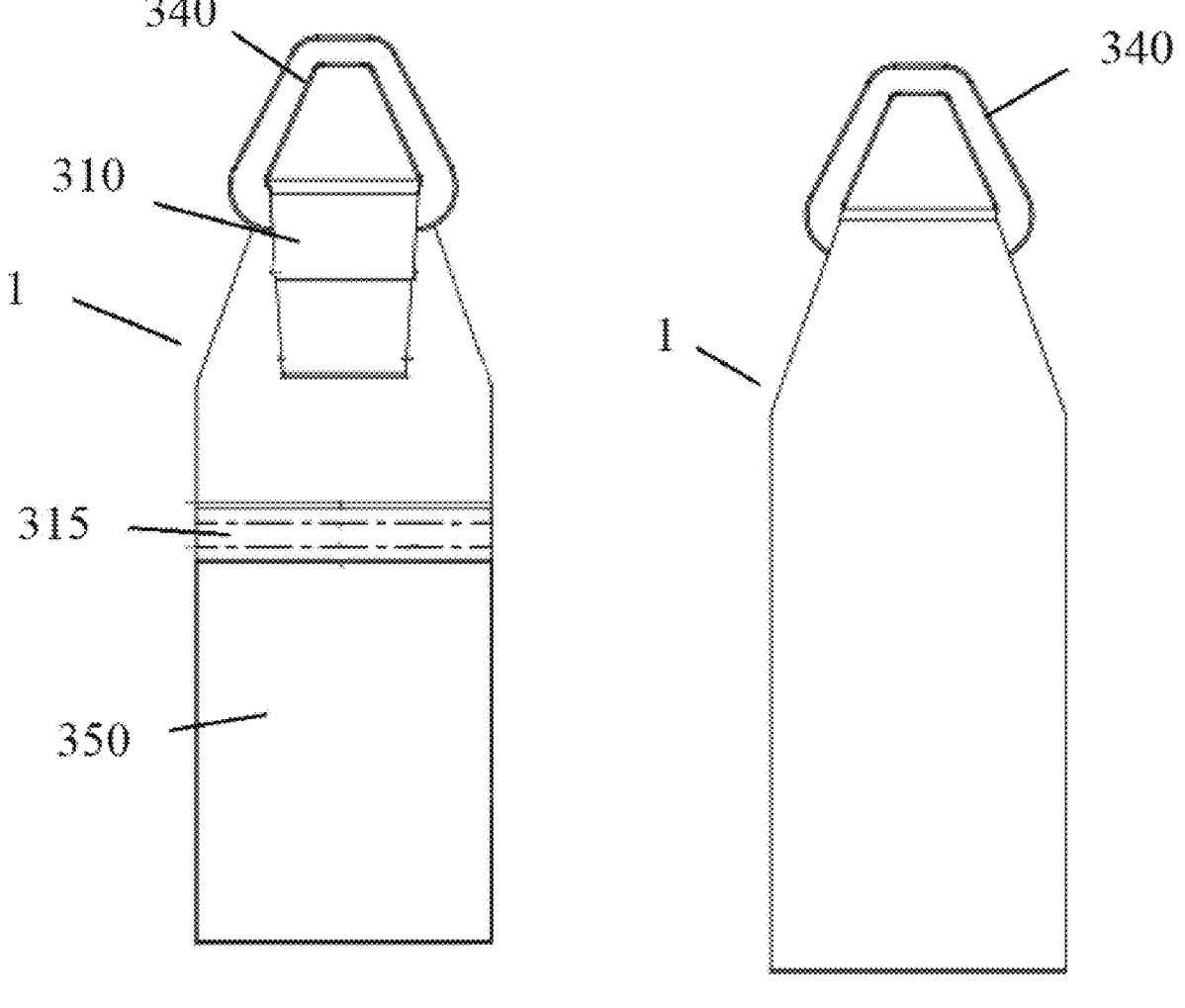
FIG. 7 shows a back view of the bed anchor.
FIG. 8 shows a front view of the bed anchor.
Figure 9:
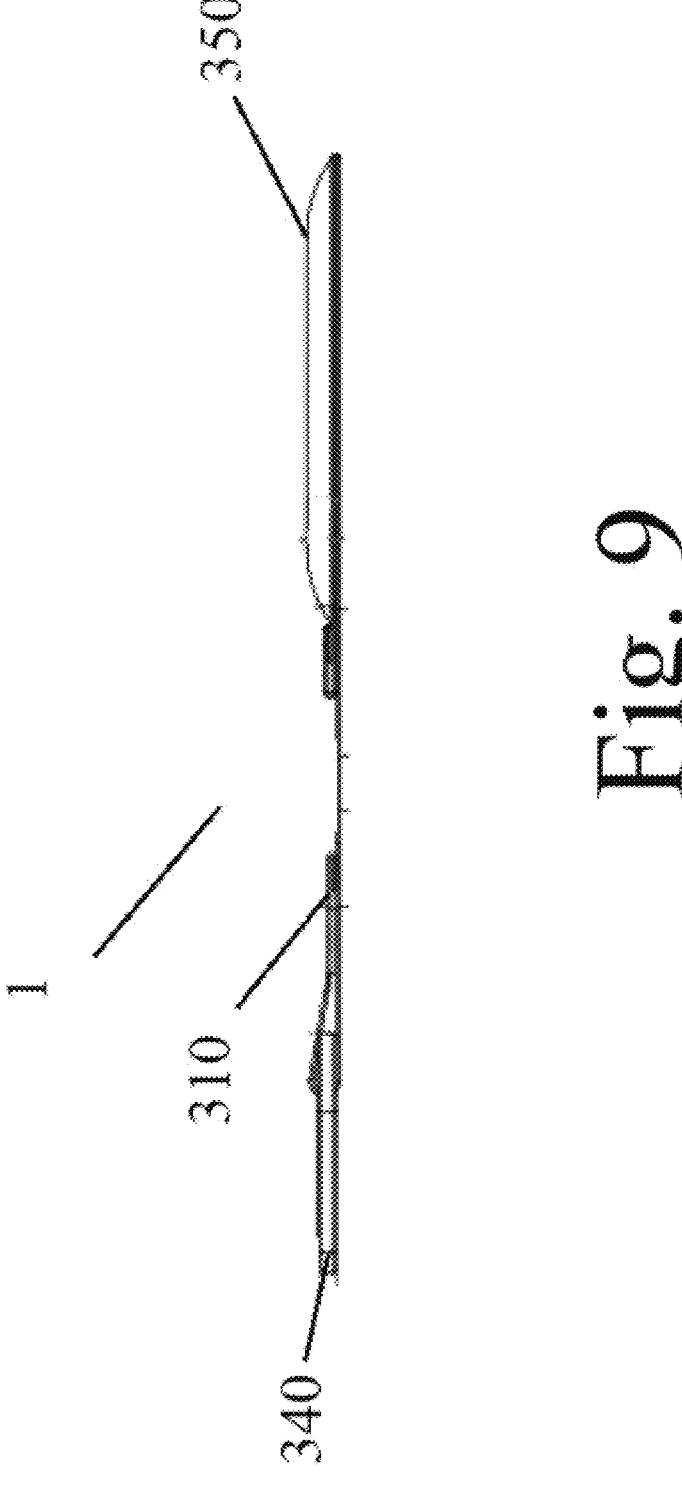
FIG. 9 shows a side view of the bed anchor.

The current invention is a bed anchor 1 as shown in FIGS. 5 though 22 that is used to secure items 500 in a vehicle's bed 200. It is comprised of a flexible anchor 1 that can be positioned between the bed 200 and a tailgate 104. It is made of a flexible soft material. It can be a solid anchor or a bag or net filled with a soft fluid fill material like plastic or rubber balls or sand or packing material or a liquid. A bed anchor 1 needs to not be hard so not the scratch or dent the vehicle 100 when being used to secure items (500).

In the preferred embodiment, the bed anchor 1 would be comprised of a bag 330 made up a soft net or solid fluid material such has a rubber or nylon or canvas bag 330 and the fill material 320 could be comprised of solid or participants like metal, rubber, hollow plastic, Styrofoam, a polymer or rubber balls. Other fill materials 320 can be used such as sand, textiles, sawdust, liquids or rubber. Nitrile Rubber Balls are a good fill material as they are Oil Resistance, Abrasion Resistance, Aging Resistance, Ozone Resistance, Soft, Light Weight with Good Bending Performance and are available in numerous sizes. The bag 330 is flexible and changes its shape based on its position or when the bed edge 204 compresses the bag 330. The compressed bag 330 will compress around the bed edge 204 increasing the ability for the bed anchor 1 to hold an item 500 in place.

In the preferred embodiment, the fill material 320 does not fully fill the bag cavity 330 allowing for the fill material 320 to easily flow within the cavity of the bag 330 allowing the fill material 320 to be evenly spread out in the flat position while also allowing the fill material 320 to flow down to form a semi-solid clump when it is hanging vertically in a storage position.

In another embodiment the bag 330 can be made of or have the fill material is a solid flexible mass that conforms to the shape of the truck bed 200. This could be a soft rubber or polymer.

FIGS. 5, 6, 7, 8 and 9 shows an embodiment of the bed anchor 1. The bed anchor 1 has a bag 330 filled with fill material 320 which combined the form the anchoring base 350. Extending out from the top of the anchoring base 350 is a securing band 310. The securing band 310 would be made of a strong, flexible material such as plastic, leather, fabric, metal or rubber. Multiple securing bands 310 can be used with a single anchoring base 350. The securing band 310 can be of any length depending on the needs of the user and how it is going to be used. The securing band 310 is flat to fit the seam between the closed tailgate 104 and bed 200. The securing band 310 could be a wire, strap, cord, rope, band, ratchet straps or cable.

In the preferred embodiment, the bed anchor 1 has a thick double or triple layer fold 315 which holds the bed anchor 1 in place and provides a folding point and prevents the securing band 310 from going through the seam between the bed 200 and the tailgate 104.

Figure 10:
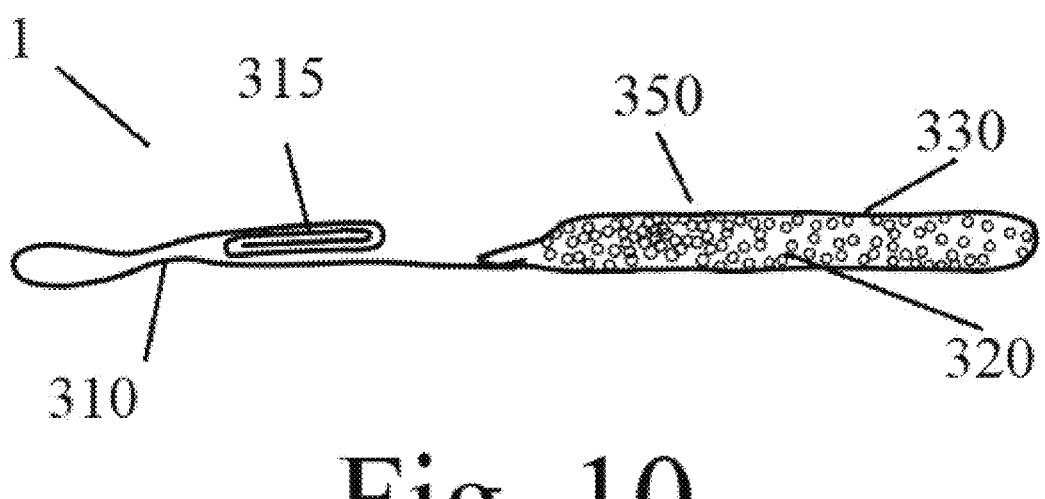
FIG. 10 shows a side cross-cut view of the bed anchor with the fill material evenly spread in the bag.

FIG. 10 shows a side view of a crosscut version of the bag 350 with the fill material 320 evenly spaced in the bag 350 allowing the bag 350 to be flat and easily moved in the space or crack made between the bed 200 and the tailgate 104. The fill material 320 is pulled equally in bag 350 in this horizontal position.

Figure 11:
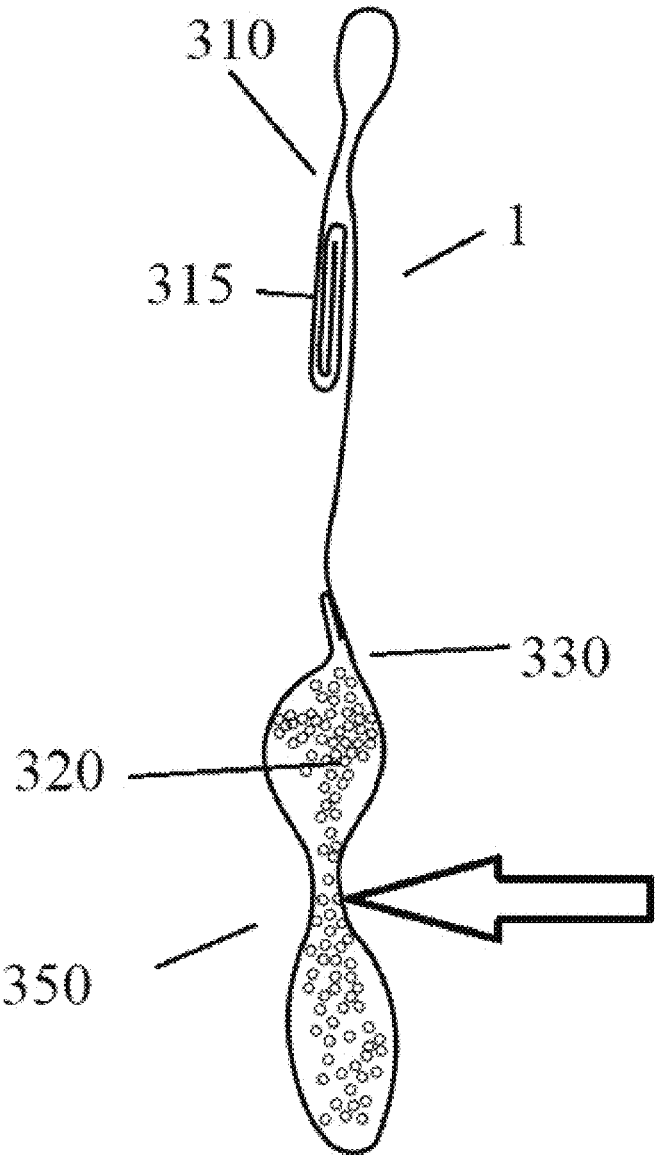
FIG. 11 shows a view of the bed anchor with the fill material moved by a side pressure.

FIG. 11 shows a side view of a crosscut version of the bag 350 when a force such as a tailgate edge 204 is placed on the bag 350. The fill material 320 moves from and surrounds the compressed area. This increases the hold of the bed anchor 1 as the bed anchor 1 holds the force area.

Figure 12:
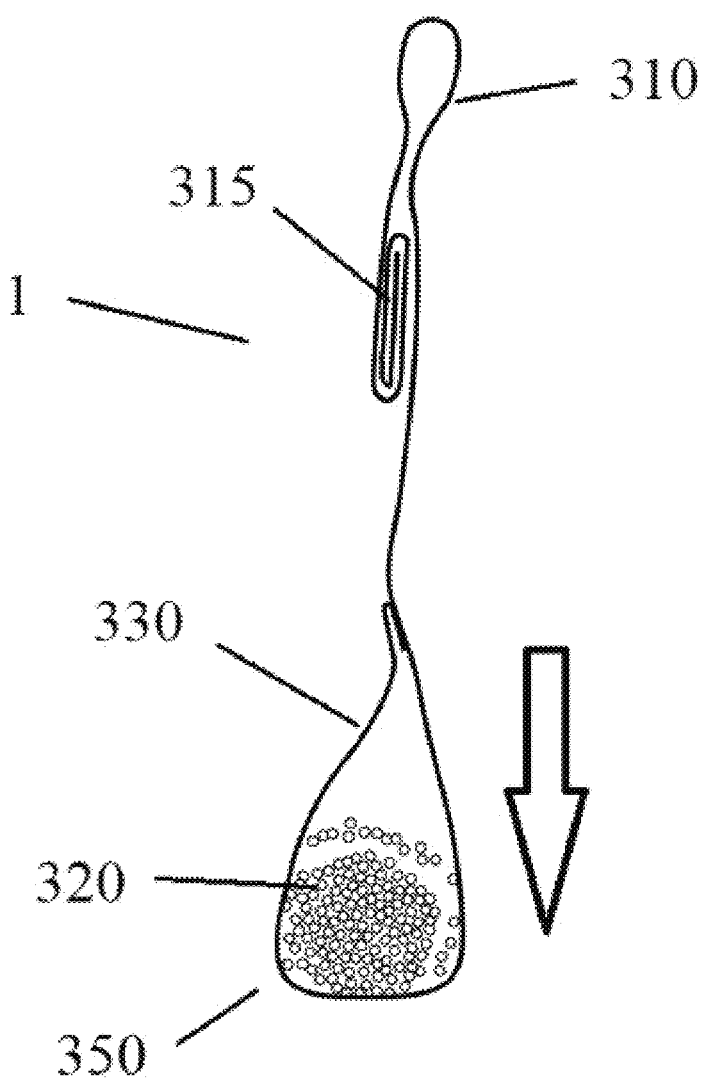
FIG. 12 shows the bed anchor with gravity pushing the fill material into the bottom of the bag.

FIG. 12 shows a side view of a crosscut version of the bag 350 when the bed anchor 1 is hanging down. Gravity forces the full material 320 to the bottom of the bag 350 forming an almost solid clump. This clump gets extremely hard and blocks the bag 350 from going through the opening/crack between the bed 200 and the tailgate 104 securing the bed anchor 1 in place and securing the item 500 being secured by the bed anchor 1.

Figure 13:
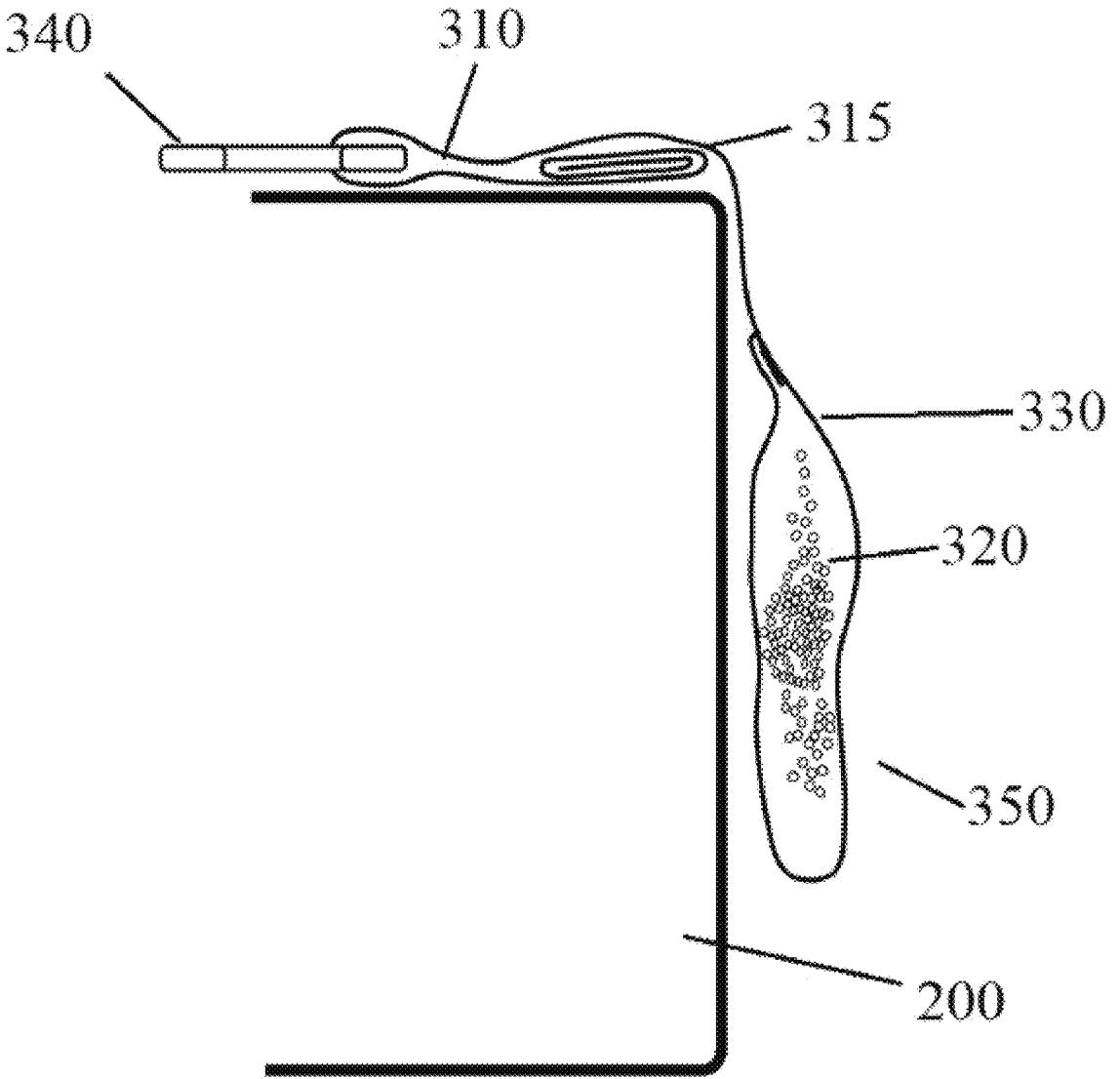
FIG. 13 shows the bed anchor at the edge of the bed.
Figure 14:
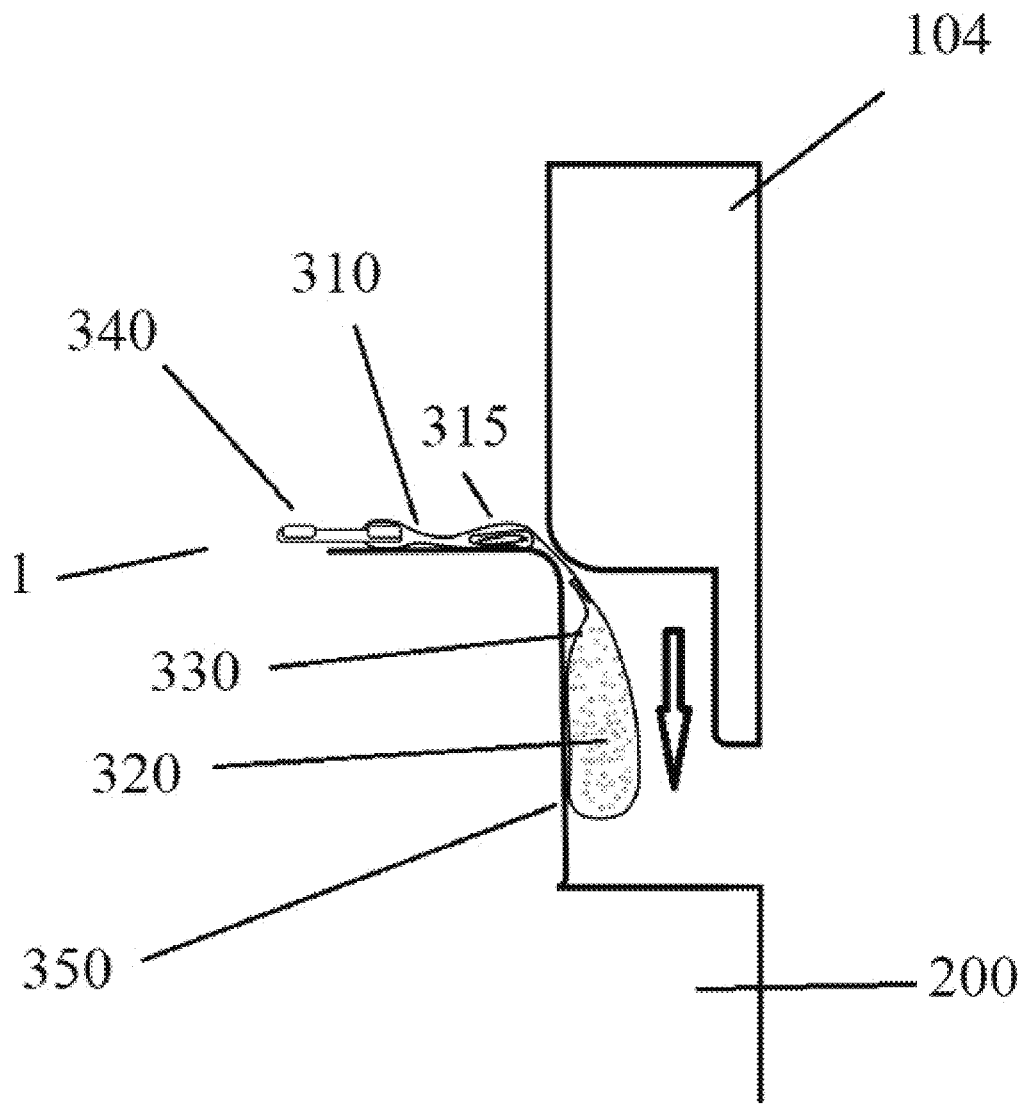
FIG. 14 shows the bed anchor being used with the bag placed between the bed and the tailgate.

FIG. 13 shows the bed anchor 1 at the edge of the bed 200 with the bag 350 hanging down from the edge. FIGS. 14 and 15 showing the bed anchor 1 being used with the tailgate 104 closed and gravity causing the fill material 320 to form a clump or ball to secure the bed anchor 1 in place with the fold 315 holding the bed anchor 1 on the inside bed 20.

Figure 1:
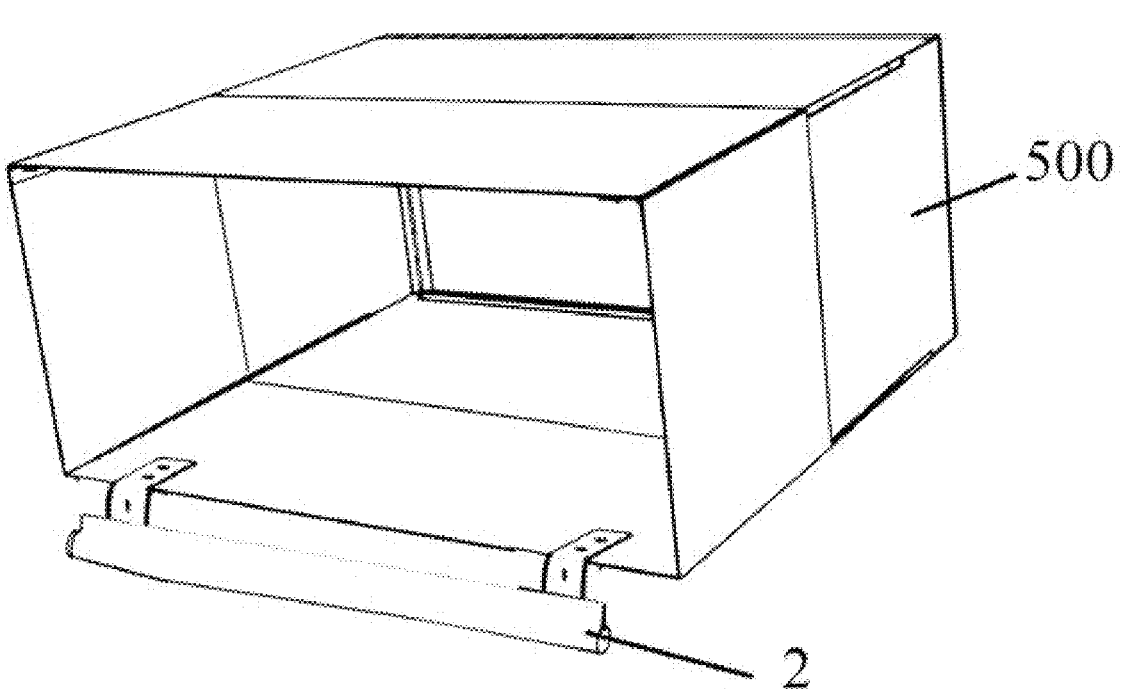
FIG. 1 shows an example of prior art using a rod.
Figure 2:
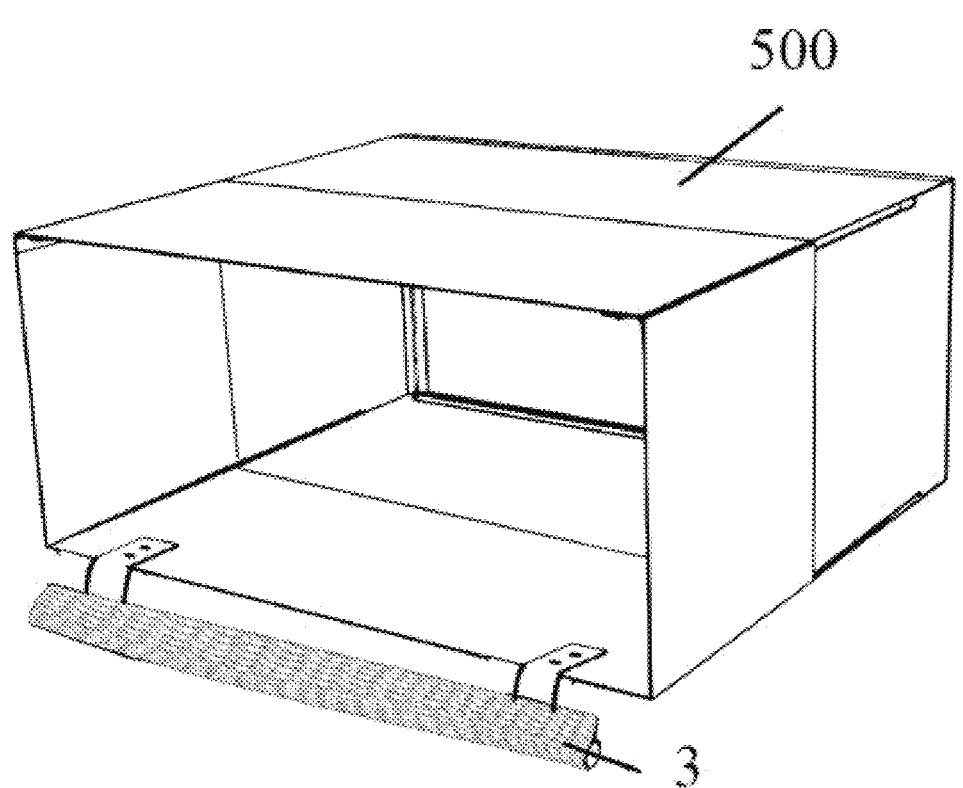
FIG. 2 shows an example of prior art using a mesh net.
Figure 3:
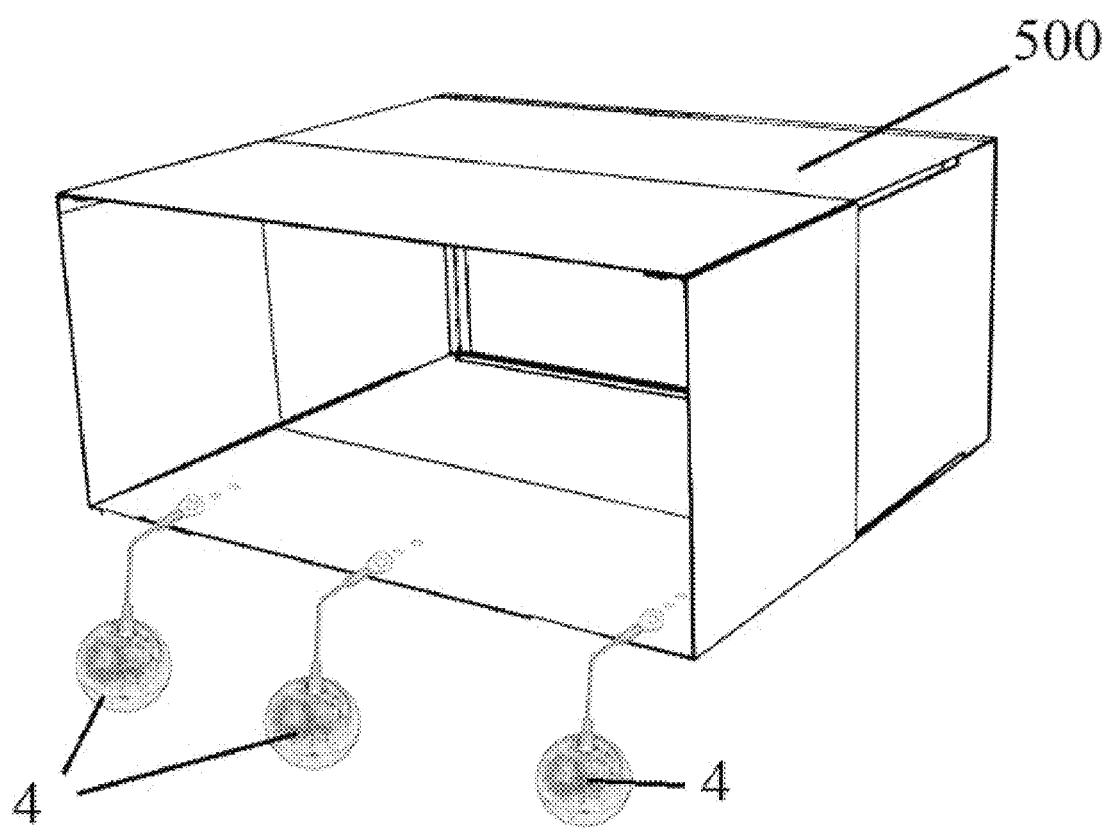
FIG. 3 shows an example of prior art using cynical weights.
Figure 4:
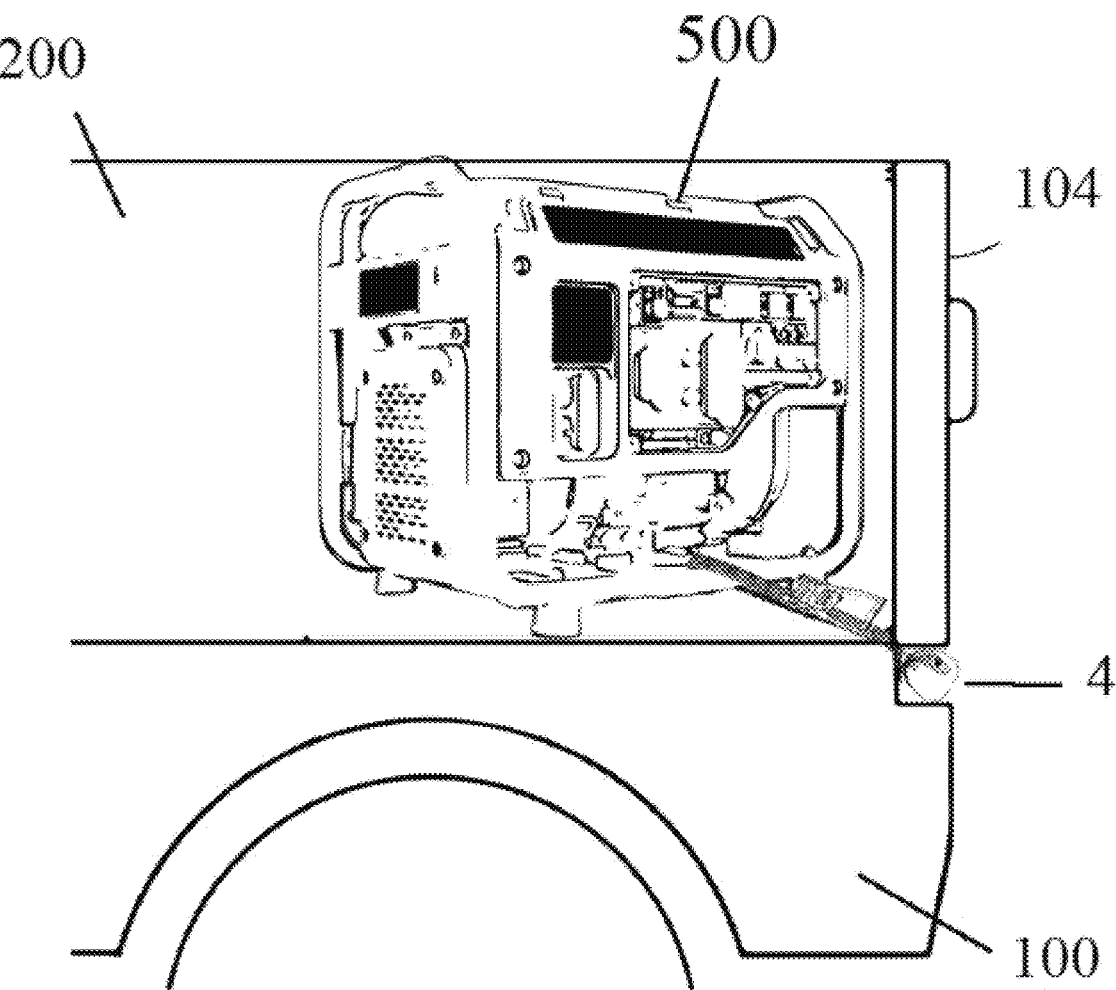
FIG. 4 shows an example of prior art using a weight.

FIG. 16 shows the bed anchor 1 at the edge of the bed 200 with the bag 350 hanging down from the edge with the tailgate 104 opened with the tailgate edge 204 positioned below the bag 330 while FIG. 17 shows the bed anchor 1 with the open tailgate 104 tailgate edge 204 intersecting the bag 330 with the fill material 320 moving around the tailgate edge 204. FIGS. 16 and 17 show the bed anchor 1 with the tailgate 104 open with the edge of the tailgate 204 intersecting the bed anchor 1 in the middle allowing the bed anchor 1 to still secure the item 500 being held. The bed anchor 1 is designed to be flexible to allow the tailgate edge 204 to hold the bed anchor 1 while not damaging the bed anchor 1 or the bed 200 or the tailgate 104 as shown in FIG. 4. The tailgate edge 204 actually helps to secure the bed anchor 1 in place.

At the other end of the securing band 310 is a securing means which in the preferred embodiment is a buckle 340. This buckle 340 allows hooks 610, cables, or rope to secure themselves to the buckle 340 and thereby to the bed anchor

1 as shown in FIG. 20. The securing means can also include a loop of the band material, hooks, cables, ratchet or clips.

FIG. 18 shows an item 500 in a bed using the bed anchors 1 to secure the generator 500 in the bed of the vehicle using the tailgate 104. The securing cable has a length long enough to secure the item 500 being secured with the bed anchors 1. The securing bands are wrapped around the generator so it can be secured by the securing bands 310.

FIGS. 19 and 20 show the bed anchor 1 in its secure position of the bag 330 being between the bed 200 and the tailgate 104 with the tailgate 104 closed.

When tailgate 104 is opened the bag 330 is positioned below the tailgate 104 with the securing band 310 running from the bag 330 through the opening between the tailgate 104 and the bed 200 when the tailgate 104 is opened. This secures the bag 330 when tailgate 104 is closed while the securing bands 310 and the buckle 340 are inside the bed 200. The bag 330 will be pressed against the outside of the tailgate 104 holding the item 500 in place. The bag 330 will be too wide to go through the opening between the closed tailgate 330 and the bed 200.

FIG. 21 displays where the securing means is a hook 800. FIG. 22 shows a dual securing means comprising a hook 800 and a buckle 340. The securing means can also be a ratchet with or without a ratchet strap.

FIG. 23 displays an alternative embodiment which uses a cable 820 or wire or rope or cord as a securing band or securing means. This embodiment has the two ends of the cable 830 connected to a base 840 which forms a closed loop. The base 840 is connected to the bag 300 with the cable 820 running through the bag 330 with the loop extended out from the bag 330. FIG. 24 shows this embodiment with the cable 820 extending through the gap between the tailgate 104 and the bed 100 with the tailgate 104 in a closed position. It also shows a flexible gap cover 109 which cover the gap. FIG. 25 shows it in with the tailgate 104 in an open position. FIG. 26 shows it with the tailgate 104 in a closed position without the gap cover 109.

FIG. 23 though FIG. 26 also shows where a solid shape can be used instead of a bag 330 as the anchoring base such as a solid triangle made of a durable material like rubber.

FIG. 27 shows multiple bed anchors 1 being positioned between the tailgate 104 and the bed 200 with the tailgate 104 in the open position.

FIG. 28 shows the bed anchor 1 with a promotional message 700 on it where the bed anchor could be to promote a business or company. This will be done on a flat portion of the bed anchor 1.

FIG. 29 shows the bed anchor 1 where the bag 330 has an elongated side that can attach to a securing means without a securing band 310. This shape can be triangular or any other shape such as a rectangular.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A device, comprising:
a bed anchor comprising an anchoring base with a securing band extending from the top of the anchoring base and connected to said anchoring base where the securing band has a securing means at the end not connected to said anchoring base where the anchoring base is comprised of a bag and a compressible fill material where the fill material is configured to move within the bag and defines means for holding the device securely between a vehicle bed and a closed tailgate.

2. The device of claim 1, further comprising where the securing band is flat.

3. The device of claim 1, further comprising where the bag is a made of a mesh material.

4. The device of claim 1, further comprising where the fill material forms a semi-solid clump.

5. The device of claim 1, further comprising where the securing means is one or more from a set of a buckle, a loop, hooks, cable, ratchet, ratchet strap or clip.

6. The device of claim 1, further comprising having a message on a flat portion of the bed anchor.

7. A process to secure an item in a truck bed, comprising:
Using a bed anchor comprising an anchoring base which is comprised of a bag and fill material with a securing band connected to said anchoring base where the securing band has a securing means at an end,

wherein when a tailgate is closed, the bag is positioned below the tailgate with the securing band running from the bag through the opening between the tailgate and a bed of a vehicle when the tailgate is closed, and
opening the tailgate which secures the bag having the tailgate compress the bag, and
holding an item in place by attaching it to the securing means.

8. The process of claim 7, further comprising where the securing band is flat.

9. The process of claim 7, further comprising where the bag is made of a solid material.

10. The process of claim 7, further comprising where the bag is a made of a mesh material.

11. The process of claim 7, further comprising where the fill material is one of more of a set of metal particulates, solid plastic particulates, hollow plastic particulates, styrofoam, polymer particulates, rubber particulates, sand, textiles, sawdust, or liquids.

12. The process of claim 7, further comprising where the fill material can be compressed into a semi-solid.

13. The process of claim 7, further comprising where the fill material is made of a solid flexible mass.

14. The process of claim 7, further comprising where the securing means is one or more from a set of a buckle, a loop, hooks, cable, ratchet, ratchet strap or clip.

15. The process of claim 7, further comprising where the securing band extends from the top of the anchoring base.

16. The process of claim 7, further comprising having a message on a flat surface of the bed anchor.

17. The process of claim 7, further comprising having a layer fold associated with the securing band.

18. The device of claim 1, further comprising where the fill material is plastic particulates.

19. The device of claim 1, further comprising where the fill material flows within a cavity of the bag.

* * * * *